MULTI-ARMED LEVER TAPE CARTRIDGE REJECTION DEVICE

Filed Sept. 18, 1967 4 Sheets-Sheet 1

MULTI-ARMED LEVER TAPE CARTRIDGE REJECTION DEVICE

Filed Sept. 18, 1967 4 Sheets-Sheet 2

3,492,005

MULTI-ARMED LEVER TAPE CARTRIDGE REJECTION DEVICE

Yoshihiro Ueno, Fujisawa, and Yoshiro Kato and Shigeo Kato, Yokohama, Japan, assignors to Victor Company of Japan, Limited, Yokohama, Japan Filed Sept. 18, 1967, Ser. No. 668,380
Claims priority, application Japan, Sept. 17, 1966, 41/87,535, 41/87,536, 41/87,537, 41/87,538; Mar. 3, 1967, 42/17,803 (all utility models)
Int. Cl. G11b *5/56, 5/78*
U.S. Cl. 274—4 9 Claims

ABSTRACT OF THE DISCLOSURE

A tape cartridge rejection device whereby a tape cartridge inserted in a tape recorder can be pushed either automatically or manually at its front end surface by a pivoting lever to move the tape cartridge backwardly a small distance or reject same, so that a pinch roller in the tape cartridge can be released from forced engagement with a capstan in the tape recorder to prevent the deformation of the pinch roller. This rejection device, when operating automatically, is actuated upon completion of performance on each channel or switching from the last channel to the first channel.

This invention relates in general to tape cartridge rejection devices, and in particular to a tape cartridge rejection device adapted for use with a tape recorder of the tape cartridge type for moving backwardly or rejecting a tape cartridge any time as desired.

A disadvantage of a tape recorder of the tape cartridge type in which a tape cartridge is inserted in a tape recorder and a tape is pressed by a capstan in the tape recorder against a pinch roller in the tape cartridge so as to reproduce recorded material has been that said capstan generally continues to bear against said pinch roller even after performance is finished, unless the tape cartridge is withdrawn from the tape recorder, causing deformation of the pinch roller.

According to the present invention, there is provided a device whereby a tape cartridge inserted in a tape recorder can be moved backwardly or rejected any time as desired, as when performance on one channel is finished, so as to release a pinch roller in the tape cartridge from forced engagement with a capstan in the tape recorder to thereby prevent the deformation of the pinch roller.

The principal object of the present invention is to provide a tape cartridge rejection device whereby a tape cartridge inserted in a tape recorder can be moved backwardly or rejected any time as desired, as when performance is finished, so as to prevent the deformation of a pinch roller in the tape cartridge.

Another object of the invention is to provide a tape cartridge rejection device whereby a tape cartridge inserted in a tape recorder can be moved backwardly or rejected so as to prevent the deformation of a pinch roller in the tape cartridge, and at the same time a power source for a capstan motor and an amplifier in the tape recorder can electrically be disconnected in conjunction with said rejection operation to thereby economize on the consumption of electricity.

Another object of the invention is to provide a tape cartridge rejection device whereby a tape cartridge inserted in a tape recorder can automatically be moved backwardly or rejected each time performance on one channel on a multiple channel tape is finished so as to prevent the deformation of a pinch roller in the tape cartridge.

A further object of the invention is to provide a tape cartridge rejection device for use with a tape recorder in which a magnetic head is successively switched from one channel to another on a multiple channel tape for reproducing recorded material on each channel, whereby a tape cartridge inserted in said tape recorder can be moved backwardly or rejected at the same time the magnetic head is switched from the last channel to the first channel, so as to prevent the deformation of a pinch roller in the tape cartridge, and performance can be commenced on the first channel at all times when a tape cartridge is inserted in the tape recorder.

Another object of the invention is to provide a tape cartridge rejection device for use with a tape recorder in which a magnetic head is successively switched from one channel to another on a multiple channel tape for reproducing recorded material on each channel, whereby the channel on which recorded material is being performed can be indicated by virtue of the operation of magnetic head switching means, and a tape cartridge inserted in the tape recorder can be moved backwardly or rejected when the magnetic head is switched from the last channel to the first channel.

Still another object of the invention is to provide a tape cartridge rejection device comprising tape cartridge rejection means which can positively operate on an instantaneous current produced when a magnetic head is switched from the last channel to the first channel.

Other objects and features of the present invention will become apparent from consideration of the following description in conjunction with the accompanying drawings, in which.

Figure 1:
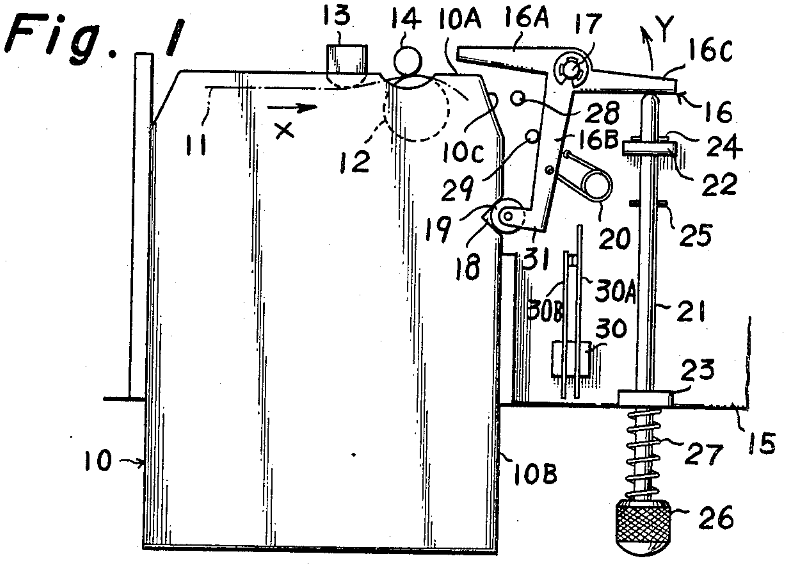
FIG. 1 is a plan view of a first embodiment of the device according to this invention.

FIG. 1 shows a plan view of one embodiment of the device according to this invention. In FIG. 1, 10 is a tape cartridge containing a magnetic tape 11 and a pinch roller 12 built therewith. A magnetic head 13 and a capstan 14 are disposed in the interior of a tape recorder casing 15 at positions where they are brought into engagement with the tape 11 when the tape cartridge 10 is inserted in the casing 15. The capstan 14 driven by a capstan motor presses the tape 11 against the pinch roller 12 and causes the tape to travel in the direction of arrow X. A substantially T-shaped rejection lever 16 is pivotally supported by a shaft 17 mounted on the casing 15. The rejection lever 16 comprises a tape cartridge push arm 16A, a tape cartridge holding arm 16B and a lever arm 16C formed integrally with one another. The tape cartridge push arm 16A is disposed in close proximity to a front end surface 10A of the cartridge 10 when the tape cartridge 10 is inserted in the casing 15. The tape cartridge holding arm 16B has at its bent front end a roller 19 adapted to be received in a V-shaped recess 18 formed on a side surface 10B of the tape cartridge 10. The lever arm 16C extends in the direction opposite to the tape cartridge push arm 16A with respect to the shaft 17. A click spring 20 has one end attached to the casing 15 and the other end attached to the tape cartridge holding arm 16B for causing the roller 19 to press against the side surface 10B of the tape cartridge with a proper force. A push rod 21 adapted for pushing the lever arm 16C at its front end is slidably journalled in bearings 22 and 23 mounted in the casing. Pins 24 and 25 are mounted on said push rod 21 for limiting the range of slidable movement of the push rod 21 with the bearing 22 being interposed therebetween. An operating knob 26 is attached to the push rod 21. A spring 27 is mounted between said knob 26 and the bearing 23 for restoring the push rod 21 to its original position upon releasing the knob 26 used for moving the push rod forwardly. Stoppers 28 and 29 limit the pivotal movement of the cartridge push arm 16A and cartridge holding arm 16B respectively.

When it is desired to manually reject the tape cartridge 10 any time as desired, as when performance is finished, the knob 26 is pushed to move the push rod 21 forwardly. The forward end of the push rod impinges on the lever arm 16C and causes same to move in pivotal motion in the direction of arrow Y. Simultaneously with the releasing of the roler 19 at the front end of the tape cartridge holding arm 16B from engagement with the recess 18 on the side surface 10B of the tape cartridge, the tape cartridge push arm 16A pushes the front end surface 10A of the tape cartridge till the former is arrested by the stopper 28, so that the tape cartridge can be moved backwardly or rejected. The distance covered by the tape cartridge in this backward movement varies depending on the position of stopper 28 or pin 25. In this embodiment of the device, the arrangement is such that the distance covered by the tape cartridge in its backward movement is smaller than the distance between the recess 18 on the side surface 10B and a tapered portion 10C of the tape cartridge.

Switch 30 serves to make and break a power source circuit for said capstan motor, an amplifier of the tape recorder and the like and comprises a movable contact member 30A and a fixed contact member 30B normally in engagement with each other. In the aforementioned rejection operation, the movable contact member 30A is pushed by an elbow 31 of the tape cartridge holding arm 16B as it moves in pivotal motion to be released from engagement with the fixed contact member 30B. Thus, the switch 30 opens said power source circuit.

Figure 2:
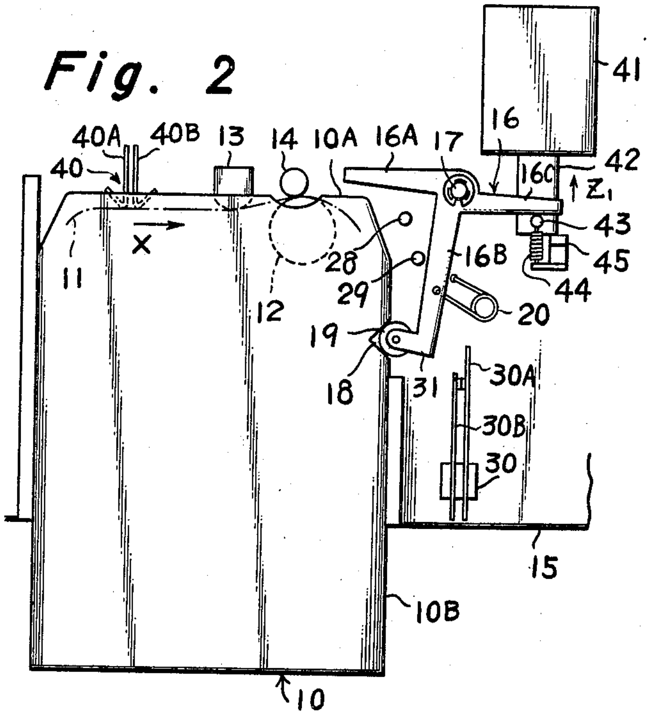
FIG. 2 is a plan view of a second embodiment of the device according to this invention.
Figure 3:
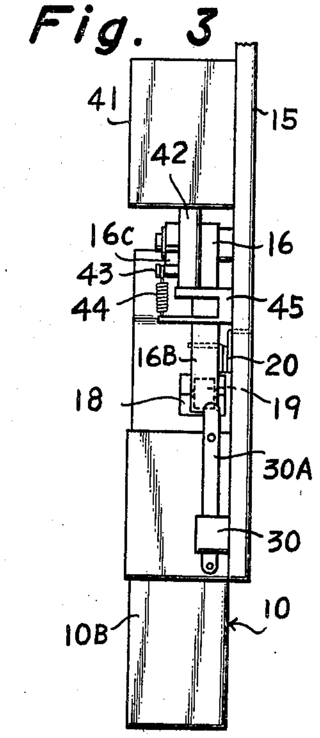
FIG. 3 is a side view of the embodiment shown in FIG. 2.
Figure 4:
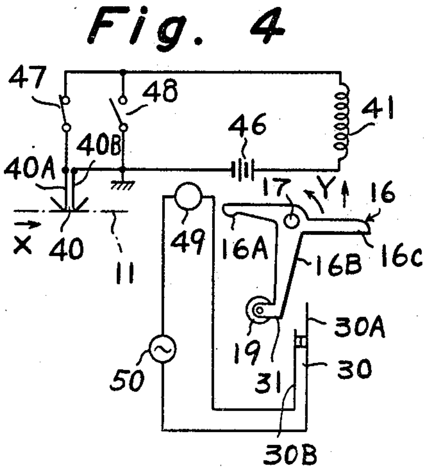
FIG. 4 is a circuit diagram in explanation of the embodiment shown in FIG. 2.

FIGS. 2 to 4 show a second embodiment of the device according to this invention. Whereas the first embodiment is adapted for manual rejection operation, this embodiment can automatically perform a rejection operation upon completion of performance of the magnetic tape. In FIGS. 2 to 4, parts similar to those shown in FIG. 1 are designated by like reference characters. Detection contact 40 detects the position of a conducting foil or a sensing tape adhered to a performance completion point on the magnetic tape 11. The contact 40 consisting of two contact members 40A and 40B is disposed at a position where it is engaged by the magnetic tape 11. A solenoid coil 41 has a plunger 42 loosely connected to said solenoid coil 41 with a pin 43 mounted thereon for engaging and pushing the lever arm 16C. A spring 44 is mounted between said pin 43 and a stopper 45 provided on the casing 15. As shown in FIG. 4, said solenoid coil 41 is electrically connected to a solenoid operating power source 46 at one end thereof and to the contact member 40A at the other end thereof through a manual switch 47 such as a push switch, for example. 48 is a manual switch connected in shunt with the contact 40 and the switch 47. A capstan motor 49 operates the capstan 14 and an amplifier of the tape recorder. A power source 50 serves both said capstan motor and amplifier 49.

The operation of the embodiment described hereinabove will now be explained. When it is desired to reject the tape cartridge 10 upon completion of a performance, the switch 47 is closed beforehand so as to close the switch 48. When the magnetic tape 11 completes its performance, the conducting foil adhered to the performance completion point on the tape engages the contact 40 and closes the contact members 40A and 40B, forming a circuit connecting the solenoid coil 41 and the power source 46. This energizes the solenoid coil 41 which tends to pull the plunger 42 into the solenoid coil, causing the plunger 42 to move in the direction of arrow Z. At the same time, the pin 43 mounted on the plunger 42 causes the lever arm 16C to move in pivotal motion in the direction of arrow Y. This causes the roller 19 mounted on the front end of the tape cartridge holding arm 16B to be released from engagement with the recess 18 on the side surface 10B of the tape cartridge, and at the same time causes the tape cartridge push arm 16A to push the front end surface 10A of the tape cartridge at its forward end till it is arrested by the stopper 28. Thus, the tape cartridge 10 is moved backwardly or rejected. Simultaneously with this rejection operation, the tape cartridge holding arm 16B pushes at its elbow 31 the movable contact member 30A to open the switch 30, thereby opening a circuit connecting the capstan motor and amplifier 49 and the power source 50. This causes the capstan motor to stop operating. When the conducting foil is released from engagement with the contact 40, the contact members 40A and 40B are opened to de-energize the solenoid coil 41, with the plunger 42 being moved by the biasing force of the spring 44 in the direction opposite to the arrow Z and restored to its original position where it is arrested by the stopper 45. It is to be noted that, although the plunger 42 is restored to its original position, the rejection lever 16 still remains in its pivoted position, so that when the tape cartridge 10 is inserted in the tape recorder again its front end surface 10A engages the tape cartridge push arm 16A and pushes same back to its original position.

When it is desired, upon completion of performance, to repeat the tune just performed or switch to the next tune, the switches 47 and 48 are kept open. With this arrangement, the solenoid coil 41 is not energized upon closure of the contact members 40A and 40B by the conducting foil on the magnetic tape 11, so that the tape cartridge 10 can continue its performance without being rejected. When it is desired to reject the tape cartridge 10 in the midst of a performance, the switch 48 is closed manually any time as desired. This forms a circuit connecting the solenoid coil 41 and the power source 46, energizing the solenoid coil 41 and in consequence rejecting the tape cartridge.

Figure 6:
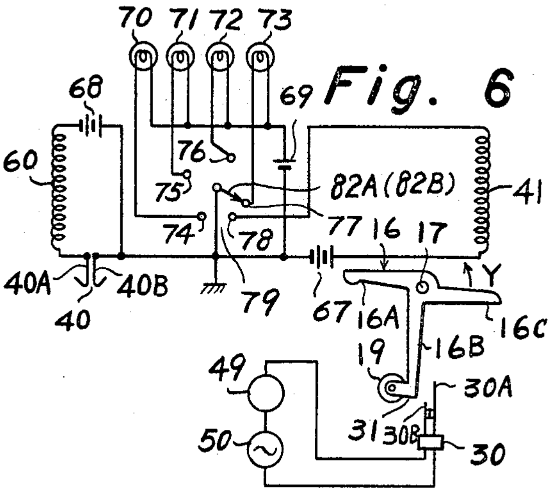
FIG. 6 is a circuit diagram of the embodiment shown in FIG. 5.
Figure 5:
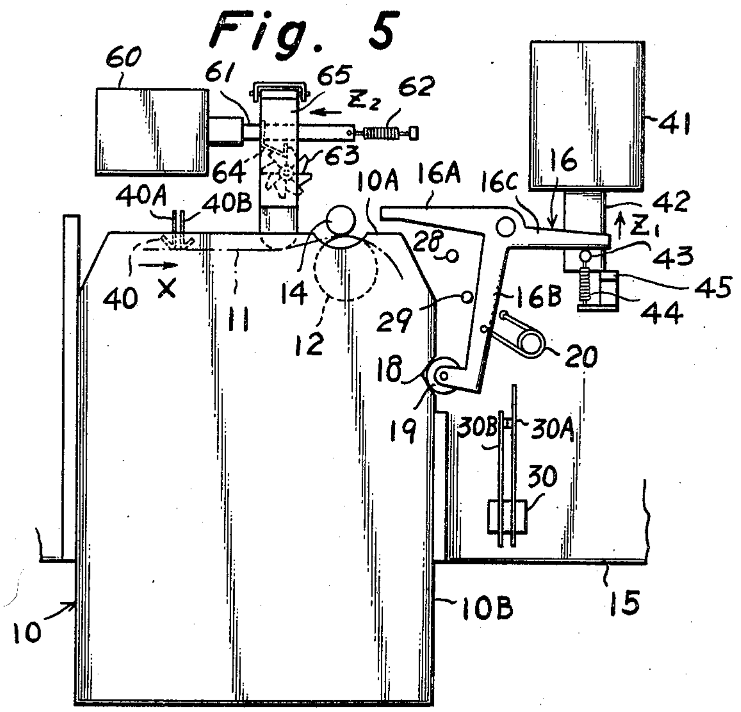
FIG. 5 is a plan view of a third embodiment of the device according to this invention.
Figure 7:
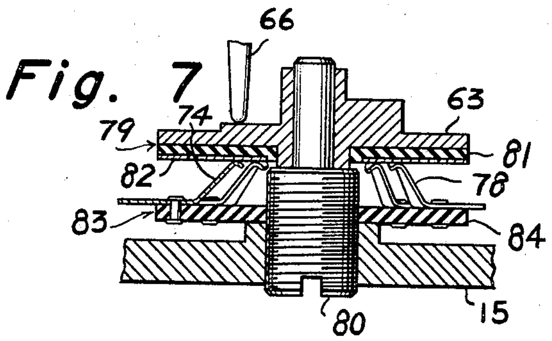
FIG. 7 is a longitudinal sectional side view of a disk-shaped rotary contact plate and a fixed contact plate of the embodiment shown in FIG. 5.
Figure 8:
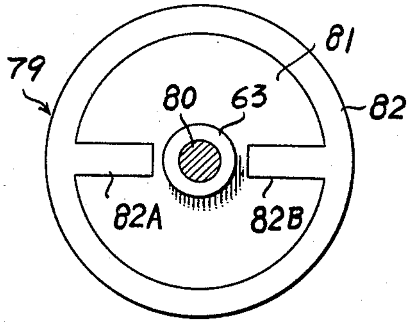
FIG. 8 is a plan view of the rotary contact plate.
Figure 9:
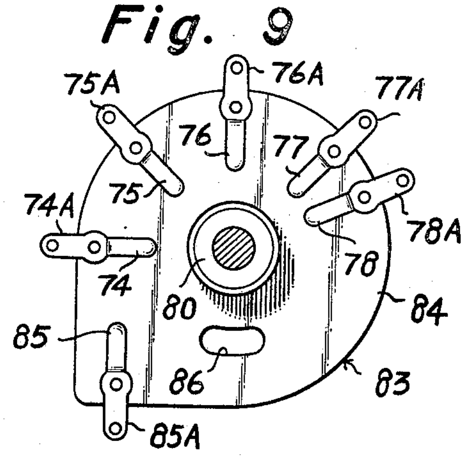
FIG. 9 is a plan view of the fixed contact plate.

FIGS. 5 to 9 show a third embodiment of the device according to this invention. In this embodiment of the invention which is adapted for use with a tape recorder of the tape cartridge type using a multiple channel magnetic tape, the tape cartridge can automatically be rejected when a magnetic head is switched from the last channel to the first channel on said multiple channel magnetic tape. In FIGS. 5 to 9, parts similar to those shown in FIG. 2 are designated by like reference characters. In FIG. 5, 60 is a solenoid coil; 61 is a plunger loosely connected to said solenoid coil 60; 62 is a spring mounted between said plunger 61 and the casing 15; and 63 is a ratchet cam plate formed to provide on its upper surface a stepped cam including eight steps in the form of spiral stairs. A pawl 64 is adapted to engage each of the stages formed on the circumferential surface of said cam plate to rotate same. A supporting arm 65 supports the magnetic head 13, which is formed to provide on its underside a projection 66 positioned against the upper surface of the ratchet cam plate 63 to press the latter with a proper force. In FIG. 6, 67 and 68 are power sources for the solenoid coils 41 and 60 respectively. Power source 69 serves for lighting one of the channel indication lamps 70, 71, 72 and 73 mounted between said power source 69 and fixed contacts 74, 75, 76 and 77. A solid contact 78 is connected to one end of the solenoid coil 41 while 79 is a disk-shaped rotary contact plate. The contacts referred to hereinabove are shown in detail in FIGS. 7 to 9. The disk-shaped rotary contact plate 79 is attached to the underside of the ratchet cam 63 rotatably mounted on a shaft 80 at its upper portion mounted on the casing 15, and comprises an insulating plate 81 such as a wiring printed base plate, for example, and a ring-shaped contact 82 printed on said insulating plate 81 and having contact members 82A and 82B projecting radially inwardly therefrom. A disk-shaped fixed contact plate 83 is fitted to the shaft 80 and firmly secured to the casing 15 at a position adjacent said rotary contact plate 79. The fixed contact plate 83 includes an insulating plate 84 such as a wiring printed base plate, for example, on which are mounted terminals 74A, 75A, 76A and 77A having said contacts 74, 75, 76 and 77 and disposed at 45 degrees with one another and a terminal 78A having a contact 78 and disposed at about 22 degrees with respect to said terminal 77A. As shown in FIG. 7, said contacts 74, 75, 76, 77 and 78 project beyond the insulating plate 84 and are positioned such that they are brought into engagement with the contact members 82A and 82B when the rotary contact plate 79 rotates. The fixed contact plate 83 also mounts a terminal 85A having a contact 85 adapted to be brought into engagement with the ring-shaped portion of the ring-shaped contact 82, said terminal 85A being connected to the power sources 67, 68 and 69. A slot 86 receives therein a support rod (not shown) firmly secured to the casing 15 for securing the fixed contact plate in place as by a screw.

Figure 10:
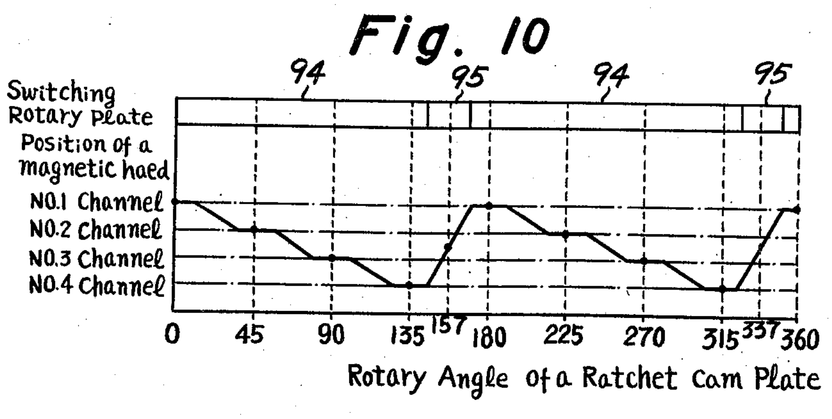
FIG. 10 shows a cam plate in relation to a magnetic head.
Figure 11:
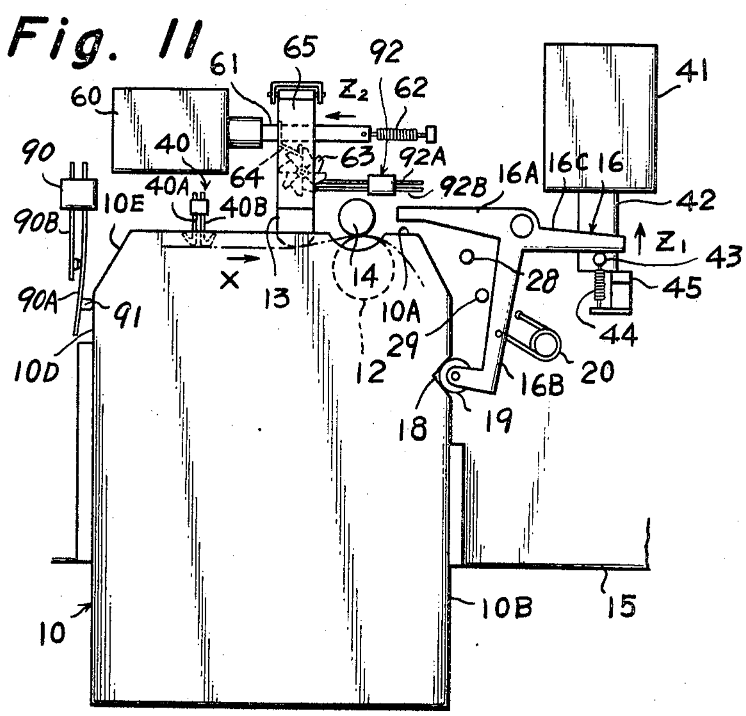
FIG. 11 is a plan view of a fourth embodiment of the device according to this invention.
Figure 12:
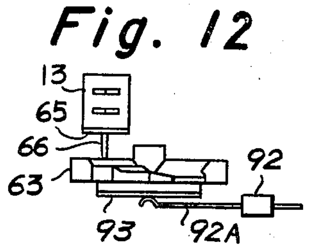
FIGS. 12 and 13 are a front view and a bottom view respectively of a ratchet cam plate and contact portions of the embodiment shown in FIG. 11.
Figure 13:
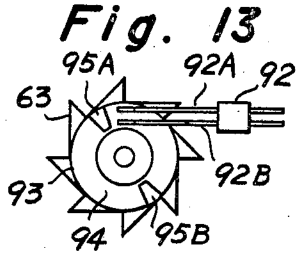

The operation of the embodiment shown in FIGS. 5 to 9 will now be explained with reference to FIG. 10. Each time a conducting foil adhered to each channel at the performance completion point on the multiple channel magnetic tape 11 is brought into engagement with the contact 40 to close the contact members 40A and 40B, a circuit connecting the solenoid coil 60 and the power source 68 is formed and the solenoid coil 60 is energized. Energization of the solenoid coil 60 causes the plunger 61 to move in the direction of arrow $Z_2$. Upon release of the conducting foil from engagement with the contact 40 as the result of further travelling of the magnetic tape 11, the contact members 40A and 40B are opened and the solenoid coil 60 is de-energized, with the plunger 61 being moved by the biasing force of the spring 62 in the direction opposite to the direction of arrow $Z_2$. At this time, the pawl 64 mounted on the plunger 61 engages the circumferential surface of the ratchet cam plate 63 to rotate and advance the cam plate by one stage. In the present embodiment, a magnetic tape having four channels is used, so that the ratchet cam plate 63 is provided with eight steps. As the ratchet cam plate 63 is rotated and advanced by stages, the magnetic head 13 is shifted in accordance with the position of the projection 66 engaging the stepped cam on the upper surface of the ratchet cam plate 63 and brought into engagement with each of the channels on the magnetic tape. The ratchet cam plate 63 rotates through an angle of 45 degrees for each operation of the plunger. As shown in FIG. 10, the positions of the magnetic head engaging the four channels on the magnetic tape 11 are selected such with respect to the angular positions of the ratchet cam plate that when the magnetic head successively engages No. 1 through No. 4 channels, the angular positions of the ratchet cam plate will vary from 0 and 180 degrees (No. 1 channel) to 45 and 225 degrees (No. 2 channel), thence to 90 and 270 degrees (No. 3 channel) and 135 and 315 degrees (No. 4 channel). Accordingly, when the rotary contact plate 79 makes a full revolution, the magnetic head is switched from No. 1 through No. 4 channels twice, and the contact members 82A and 82B are successively brought into engagement with the contacts 74, 75, 76 and 77 in accordance with the position of the magnetic head for each one half revolution of the rotary contact plate 79, whereby a circuit connecting the power source is formed to light each of the channel indication lamps 70, 71, 72 and 73 successively. When the magnetic head 13 is switched from channel No. 4 to channel No. 1 or when the rotary contact plate 79 is disposed at a rotational angle of about 157 or 337 degrees, the contact members 82A and 82B engage the contact 78 for an instant. When this engagement takes place, a circuit connecting the solenoid coil 41 and the power source 67 is formed so that the solenoid coil 41 is energized, whereby the plunger 42 can be moved in the direction of arrow Z. The movement of the plunger in the direction of arrow Z causes, in the same manner as explained with reference to the second embodiment, the tape cartridge push arm 16A to reject the tape cartridge 10. From the foregoing description, it will be appreciated that in the present embodiment of the invention the tape cartridge is automatically rejected when the magnetic head is switched from the last channel to the first channel, so that when a tape cartridge is inserted into the tape recorder performance always begins with the first channel.

Figure 14:
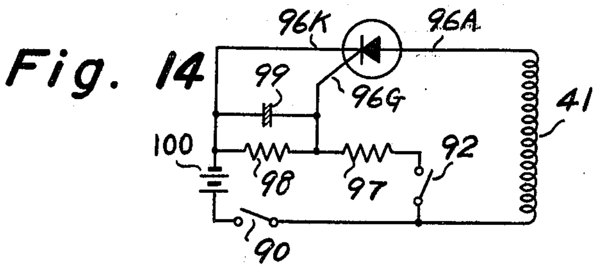
FIG. 14 is a circuit diagram of essential portions of the embodiment shown in FIG. 11.

FIGS. 11 to 14 show a fourth embodiment of the device according to this invention. The present embodiment is constructed such that tape cartridge rejection operation can positively be performed even if the current passing to the solenoid coil 41 when the magnetic head is switched from the last channel to the first channel is an instantaneous current. In FIGS. 11 to 14, parts similar to those shown in FIG. 5 are designated by like reference characters. A switch 90 comprises contact members 90A and 90B, said contact member 90A having a projection 91. The contact members 90A and 90B are open when no tape cartridge is inserted in the casing 15. When the tape cartridge 10 is inserted in the casing 15, said projection 91 engages a tapered portion 10E of said tape cartridge and slides along said tapered portion as the tape cartridge is inserted deeper into the casing. As the projection 91 comes into engagement with a side surface 10D, the contact members 90A and 90B are brought into engagement with each other to close the switch 90. Switch 92 comprises contact members 92A and 92B. A rotary contact plate 93 attached to the underside of the ratchet cam plate 63 includes a base plate 94 formed of an insulating material on which conducting members 95A and 95B are mounted as by printing at positions diametrically opposed to each other. It is to be noted that said contact members 92A and 92B are disposed at positions where they are engaged by said conducting members 95A and 95B. Rotation of the ratchet cam plate from 0 to 180 degrees (180 to 360 degrees) results in the magnetic head being switched successively from No. 1 channel through No. 4 channel. When the magnetic head is switched from No. 4 channel to No. 1 channel or when the ratchet cam plate has made a one half revolution or rotated through an angle of about 157 or 337 degrees, the contact members 92A and 92B are closed by the conducting members 95A and 95 B to close the switch 92, as shown in FIG. 10 in the upper part thereof. In FIG. 14, 96 is a control rectifier such as a silicon controlled rectifier, for example, which comprises an anode 96A, cathode 96K and gate 96G. A resistor 97 is connected in series with the switch 92 and also connected with the cathode 96K of the control rectifier 96 for preventing a surge current from being produced when said switch is closed and for obtaining a gate current of said control rectifier 96. Connected across the gate 96G and the cathode 96K of the control rectifier 96 is a resistor 98 which renders the control rectifier more highly resistant in the forward direction, and a capacitor 99 connected in shunt with said resistor and having a proper time constant to protect the circuit against erroneous operation due to a slight electric impact. 100 is a solenoid coil operating power source connected to the solenoid coil 41 through the cathode 96K and the switch 90.

The operation of the embodiment described hereinabove will now be explained. Upon insertion of the tape cartridge 10 into the casing 15, the projection 91 on the contact member 90A presses against the side surface 10D of the tape cartridge 10 to close the switch 90, forming a circuit connecting the control rectifier 96 and the power source 100. Normally, the control rectifier has a higher resistance in the forward direction, so that no current flows to the solenoid coil 41 to energize same. Each time a conducting foil is brought into engagement with the contact 40 as the magnetic tape travels, the plunger 61 is actuated to thereby rotate the ratchet cam plate 63 by one stage and switch the magnetic head from one channel to another, with the switch 92 being closed when the magnetic head is switched from No. 4 channel to No. 1 channel. Upon closing of the switch 92, an instantaneous current produced by the closing operation is passed to the gate 96G of the controlled rectifier element 96 through the resistor 97. Once the current flows to said gate 96G, the forward resistance of the controlled rectifier element 96 is reduced, permitting the current to flow to the solenoid coil 41. Thus, the current continues to flow to the solenoid coil 41 by virtue of the characteristics of the control rectifier 96 in spite of the fact that the switch 92 is closed, so that the solenoid coil 41 is energized to move the plunger 42 in the direction of arrow Z1. Thus, the tape cartridge 10 is rejected by the tape cartridge rejection arm 16A which is pivoted in the same manner as described with reference to the second embodiment of the invention. From the foregoing description, it will be apparent that tape cartridge rejection operation can positively be performed in the present embodiment. It is to be noted that since the switch 92 has only to control a current less than $\frac{1}{30}$ the current flowing to the solenoid coil 41, there is no need of processing the contact members 92A and 92B of the switch 92 and the conducting members 95A and 95B through a special operation, such as for imparting arc-resistance to the contacts.

While the invention has been shown and described with reference to some of the preferred embodiments thereof, it is to be understood that the invention is not limited thereto, and that changes may be made therein without departing from the spirit and scope of the invention.

What we claim is:

1. A tape cartridge rejection device adapted for use with a tape recorder in which is inserted a tape cartridge having a multiple channel magnetic tape and a pinch roller built thereinto so that said tape will be pressed by a capstan against said pinch roller for playing back recorded material, comprising a lever pivotally mounted and including a first arm disposed in close proximity to a front end surface of the tape cartridge inserted in the tape recorder, a second arm pressing against a side surface of the tape cartridge for holding same, and a third arm adapted to be pushed and moved, said first, second and third arms being formed integrally; magnetic head switching means for switching a magnetic head to bring same into engagement with one channel after another on the magnetic tape; a first plunger for operating said switching means, a first power source for operating said first plunger, a contact adapted to be engaged and closed by a conducting foil disposed at the performance completion point on each channel on said tape to thereby close a circuit connecting said first plunger and said first power source; a second plunger adapted to be operated to push and move said third arm of said lever to move the lever in pivotal motion; a second power source for operating said second plunger; and a switch operatively connected to said switching means for closing a circuit connecting said second plunger and said second power source; said first arm of said lever being brought into engagement with said front end surface of the tape cartridge upon pivoting of said lever to move the tape cartridge backwardly to reject same to thereby release said pinch roller from forced engagement with said capstan and said second arm of said lever being released from forced engagement with said side surface of the tape cartridge upon pivoting of said lever.

2. A tape cartridge rejection device as claimed in claim 1 in which said magnetic head switching means is a rotatably mounted ratchet cam plate, and said switch consists of fixed contacts and a rotary contact mounted on said ratchet cam plate.

3. A tape cartridge rejection device as claimed in claim 1 in which said switch is operatively connected to said magnetic head switching means and closed when said switching means switches the magnetic head from the last channel to the first channel.

4. A tape cartridge rejection device as claimed in claim 1 which comprises channel indication lamps equal in number to the channels on the magnetic tape, a power source for lighting one of said channel indication lamps, and a switch operatively connected to said magnetic head switching means, said switch being adapted, when the magnetic head is in engagement with one of the channels on the magnetic tape, to close a circuit connecting the channel indication lamp for the particular channel engaged by the magnetic head and said power source for lighting said channel indication lamp and, when the magnetic head is switched from the last channel to the first channel of the magnetic tape, to close a circuit connecting said second plunger and said second power source.

5. A tape cartridge rejection device as claimed in claim 3 in which a control rectifier is mounted between said second power source and said second plunger, said rectifier comprising an anode, cathode and gate, said anode and said cathode being connected in series with each other and said gate being connected to said switch, said rectifier being adapted to control the flow of a current to said second plunger by means of an instant current produced when said switch is closed.

6. A tape cartridge rejection device for use with a tape recorder in which is inserted a tape cartridge having a magnetic tape and a pinch roller built thereinto so that said tape will be pressed by a capstan against said pinch roller for playing back recorded material, comprising a lever pivotally mounted and including at least a first arm disposed in close proximity to a front end surface of the tape cartridge inserted in the tape recorder and a second arm bearing against a side surface of the tape cartridge for holding same, said first arm and said second arm of said lever being formed integrally, a normally closed switch forming an element of a power source circuit and disposed in proximity to said second arm, and means for moving said lever in pivotal motion, said first arm of said lever being brought into engagement with said front end surface of the tape cartridge upon pivoting of said lever to push the tape cartridge backwardly to reject same and said second arm of said lever being released from forced engagement with said side surface of the tape cartridge and simultaneously pushing and urging said switch to an opened state upon pivoting of said lever whereby the power source circuit is opened.

7. A tape cartridge rejection device for use with a tape recorder in which is inserted a tape cartridge having a magnetic tape and a pinch roller built thereinto so that said tape will be pressed by a capstan against said pinch roller for playing back recorded material; comprising a lever pivotally mounted and including at least a first arm disposed in close proximity to a front end surface of the tape cartridge inserted in the tape recorder, a second arm bearing against a side surface of the tape cartridge for holding same and a third arm adapted to be pushed and moved; said first, second and third arms being formed integrally; and a slidable rod adapted to be operated manually to move in sliding motion to push said third arm of said lever to thereby cause said lever to move in pivotal motion; said first arm of said lever being brought into engagement with said front end surface of the tape cartridge upon pivoting of said lever to push the tape cartridge backwardly to reject same and said second arm of said lever being released from forced engagement with said side surface of the tape cartridge upon pivoting of said lever.

8. A tape cartridge rejection device for use with a tape recorder in which is inserted a tape cartridge having a magnetic tape and a pinch roller built thereinto so that said tape will be pressed by a capstan against said pinch roller for playing back recorded material; comprising a lever pivotally mounted and including at least a first arm disposed in close proximity to a front end surface of the tape cartridge inserted in the tape recorder, a second arm bearing against a side surface of the tape cartridge for holding same and a third arm adapted to be pushed and moved; said first, second and third arms of said lever being formed integrally; a plunger adapted to be actuated to push said third arm of said lever to cause said lever to move in pivotal motion; a power source for operating said plunger; and a contact member adapted to be engaged by a conducting foil on the magnetic tape and closed thereby to close a circuit connecting said plunger and said power source; said first arm of said lever being brought into engagement with said front end surface of the tape cartridge upon pivoting of said lever to push the tape cartridge backwardly or reject same and said second arm of said lever being released from forced engagement with said side surface of the tape cartridge upon pivoting of said lever.

9. A tape cartridge rejection device as claimed in claim 8, further comprising a switch adapted to be closed manually to close said circuit connecting said plunger and said power source.

References Cited

UNITED STATES PATENTS 3,083,269 3/1963 Gaubert ---------- 242—55.13

BERNARD KONICK, Primary Examiner

JEROME P. MULLINS, Assistant Examiner

U.S. Cl. X.R.

179—100.2